United States Patent Office 3,437,666
Patented Apr. 8, 1969

3,437,666
PREPARATION OF ALKYLENES
MONOTHIOCARBONATES
Bernard Pfugfelder, Artix, Georges Benne, Pau, and
Claude Cazajous, Eogenne Camptort, France, assignors
to Societe Nationale des Petroles d'Aquitaine, Paris,
France
No Drawing Filed Jan. 11, 1965, Ser. No. 424,810
Claims priority, application France, Jan. 14, 1964,
960,212; Sept. 14, 1964, 988,010
Int. Cl. C07d 89/06
U.S. Cl. 260—327        7 Claims

ABSTRACT OF THE DISCLOSURE

The present invention relates to a new process for the preparation of alkylene monothiocarbonates and more particularly of those of light olefines, particularly those of which the molecule contains 2 to 5 carbon atoms. It is particularly applicable to the manufacture of monothiocarbonates of ethylene and propylene or of chloropropylene. The monothiocarbonates are prepared by condensing a thiocyanate with an alkylene oxide in an aqueous acidic medium and at a temperature of from 0 to 50° C. until the hydroxythiocyanate of the alkylene is produced. The hydroxythiocyanate is then isomerized, cyclized and hydrolized to form the monothiocarbonate. The latter is known to be useful in the preparation of episulfides by pyrolysis which are in turn useful as polymer intermediates and insecticides.

---

The monothiocarbonates are of industrial interest for the preparation of alkylene sulphides, of which the first member which is the most employed is ethylene sulphide $C_2H_4S$.

It is known to prepare ethylene monothiocarbonate by the reaction of carbon oxychloride with mercaptoethanol, but the yields obtained with this reaction are low. Another known process is based on the action of ethyl chloroformate on the sodium mercaptide of mercaptoethanol. This method would lead to fairly good yields, but the starting materials which are employed are not very common; this process cannot be easily carried out on an industrial scale. It is also known to condense thiocyanates with ethylene oxide, as described in U.S. Patents 2,094,-914 and 2,094,837 or in German Patent 636,708, but the methods involved give substantially no ethylene monothiocarbonate; they lead to ethylene sulphide which very rapidly polymerizes in the reaction medium within which it is prepared.

The invention, on the contrary, enable different alkylene monothiocarbonates to be prepared from readily available and inexpensive industrial products; it also makes convenient manufacture possible with good yields.

The new process according to the invention consists in condensing a thiocyanate with an alkylene oxide in very acid aqueous medium and is then transforming the alkylene hydroxythiocyanate which is formed into monothiocarbonate by isomerisation, cyclisation and hydrolysis. Thus, the first phase of the new process can be represented by the reaction

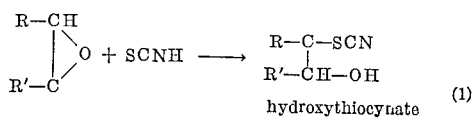
hydroxythiocynate (1)

In these formulae, R and R' can be hydrocarbon radicals, particularly with one or two carbon atoms and optionally halogenated, for example chlorinated; each of them, or both of them at the same time, can also be hydrogen atoms. The aqueous medium within which the condensation takes place has a pH value which is between approximately 0 and 3 and preferably as close as possible to 1. This pH value can be obtained by acidification by means of any inorganic or organic acid, but preferably of course a strong acid. It is expedient to make use of an acid with which there is no danger of it combining with the epoxide being used; for this reason, it is desirable to use acids such as sulphuric or phosphoric acids. Very favourable results are obtained with 40 to 60% sulphuric acid aqueous solutions.

According to one preferred method of operation, the hydroxythiocyanate, formed by the condensation of the thiocyanate with alkylene oxide, is separated from its preparatory aqueous medium and can be isomerized, cyclised and hydrolised in a separate working phase.

Various thiocyanates can be used as starting material in the new process; in particular, it is possible to employ thiocyanates of alkaline earth or other metals, but in a particularly advantageous method of operation, it is ammonium thiocyanate which is used.

When the cation of the thiocyanate being employed gives, in the reaction medium, salts which are insufficiently soluble to lead to a fairly dense solution, the hydroxythiocyanate which is formed has to extracted from the reaction medium, particularly by means of a solvent. Chloroform is very suitable for this purpose. It is generally necessary to make use of this extraction operation when the initial thiocyanate is for example, that of potassium or sodium.

On the contrary, if ammonium thiocyanate is used as starting material, the ammoniacal salts, present in the reaction medium are sufficiently soluble to impart to this medium a density which permits the separation of the alkylene hydroxythiocyanate by simple decantation; in this case, the process according to the invention can be conducted without solvent extraction.

The condensation of the thiocyanate with the epoxide according to the invention may be conducted at temperatures which are up to 50° C., but which are preferably between 0° and 40° C.; excellent results are obtained in the region of 2 to 12° C. and particularly in the region of 5°.

The process according to the invention can be carried out with the different epoxides, such as for example ethylene oxide, 1,2-propylene and 1,3-propylene oxides, 1,2-butene oxide, 2,3-butene oxide, 1,2-pentene oxide, 2,3-pentene oxide, etc., or halo-epoxides.

For example, it is possible to use the simplest haloepoxide

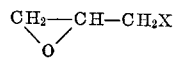

i.e., halo-propylene oxide, in which X can be an F, Cl, Br or I atom. However, the —CH$_2$X radical may be replaced by a radical having several carbon atoms, for example 2 to 6, and it may have several halogens, for example 1 to 3, the position of which is not necessarily in the alpha position with respect to the epoxy group

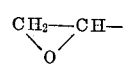

Concerning halo-epoxides the process according to the invention is particularly suitable for the preparation of monothiocarbonates when using mono or dichloroepoxides of the above alkylenes having 2 to 5 carbon atoms.

As already mentioned above, the isomerisation, the cyclisation and the hydrolysis of the alkylene hydroxythiocyanate obtained during the condensation may be carried out directly or even after the isolation of the salt of 2-imino-1,3-oxathiolane. Thus, the invention can be carried out in two different forms.

In the particularly practical form of execution, which consists in effecting the isomerisation, the cyclisation and the direct hydrolysis of the hydroxythiocyanate in a single operation, this compound is subjected to heating in the presence of a concentrated acid aqueous solution. The transformation can be illustrated by the following equations.

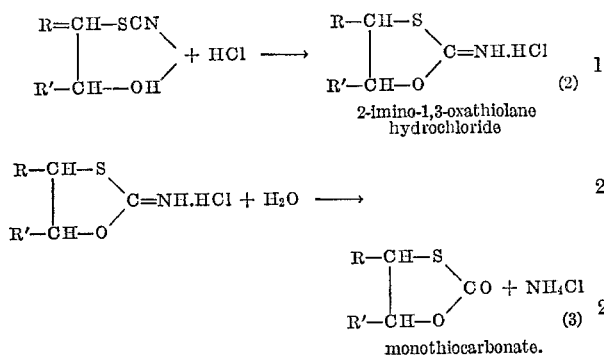

It is obvious that the acid employed for the hydrolysis is not necessarily HCl and it is even preferable to employ a sulphuric acid solution with a concentration of the order of 40 to 50%.

The preferred temperatures for this operation are of the order of 60 to 100° C., at which temperatures the reaction is very rapid, generally lasting some 3 to 5 minutes. The monothiocarbonate which is obtained is sufficiently pure to dispense with its subsequent rectification for the majority of applications. When it is a question of preparing a halogenated alkylene monothiocarbonate, the preferred temperature is from 100 to 200° C.

In the second variant of the process according to the invention, the hydroxythiocyanate is subjected to the action of a gaseous hydracid at a sufficiently low temperature, generally of the order of 0 to 20° C., in order to effect the isomerisation in accordance with equation (2) already set out above. The 2-imino-1,3-oxathiolane salt is then hydrolysed by heating with an acid of moderate concentration at a fairly high temperature, for example, of the order of 100° C. There is then produced the Reaction 3, which leads to the monothiocarbonate.

In order to illustrate the invention several non-limiting examples are hereinafter described.

Example 1

Condensation of potassium thiocyanate with ethylene oxide

Into a 1-litre Grignard apparatus equipped with a stirrer device, a gas-bubbling tube, a condenser connected to a pad, a glass electrode connected to a pH meter and a graduated ampoule, there are introduced 2 mols of potassium thiocyanate in solution in 200 ml. of water. The solution is cooled to +5° C. and kept at this temperature while ethylene oxide is caused to bubble therein at the rate of 1 mol. per hour, that is to say, about 25 litres per hour. Throughout the entire gas-bubbling period, the pH of the reaction medium is kept at 1 by adding a 50% sulphuric acid aqueous solution from the graduated ampoule. The condensation is terminated after 2 hours; the reaction medium is then subjected to four successive extractions, each with 100 ml. of chloroform. After dehydration of the chloroformic solution with anhydrous sodium sulphate, the solvent is driven off. The ethylene hydroxythiocyanate is thus obtained with a yield of 85% relatively to the potassium thiocyanate which is used.

Example 2

Condensation of ammonium thiocyanate with ethylene oxide

An operation similar to that of Example 1 was carried out, starting with 2 mols of SCNNH$_4$ dissolved in 125 ml. of water. This salt was condensed with 2 mols of ethylene oxide. In order to maintain the pH value of 1 during the condensation, a total of 117 ml. of normal H$_2$SO$_4$ was introduced. After 2 hours, the formed ethylene hydroxythiocyanate (203 ml.) was separated by simple decantation from the upper layer of the reaction liquid.

Example 3

Direct hydrolysis of the hydroxythiocyanate

The 203 ml. of product obtained in Example 2 were mixed with 203 ml. of 45% sulphuric acid and the mixture was brought to 80° C. during 4 minutes. After this heating period, the acid solution became cloudy and permitted decantation of monothiocarbonate. The 166 g. of this substance in the crude state gave 155 g. of pure product after rectification; the yield of this product, with respect to the thiocyanate used, was 75%. The boiling temperature was 80–90° C./0.15–0.2 mm. Hg. The refractive index (25–D) was found to be equal to 1.5090, as against 1.5085, as indicated in literature.

Example 4

Isomerisation, cyclisation and hydrolysis

A chloroformic solution of hydroxythiocyanate, obtained in an operation such as that described in Example 1, is treated with dry hydrochloric acid at 10° C. for 1½ hours. The 2-imino-1,3-oxathiolane hydrochloride, which precipitates in the chloroformic medium, is separated by filtration. It is then placed in a 10% hydrochloric acid solution and subjected to heating to about 100° C. for 45 minutes. Ethylene monothiocarbonate is thus obtained with a yield of 71%.

Example 5

In an operation similar to that of Example 2, 2 mols of ammonium thiocyanate are condensed with 1,2-propylene oxide. 2 mols of this compound are introduced dropwise, keeping the pH at 1.

During the condensation, 110 ml. of normal H$_2$SO$_4$ are introduced.

After 1½ hours, the ethylene methylhydroxythiocyanate as formed (240 ml.) is decanted. These 240 ml. of product as thus obtained are hydrolised with 240 ml. of 45% H$_2$SO$_4$ in accordance with the same procedure as that set out in Example 3.

The 195 g. of crude product thus formed yielded 180 g. of pure product after rectification (propylene monothiocarbonate).

The yield relatively to the thiocyanate used was 76%. The product had a boiling temperature of 64 to 74° C./0.07–0.1 mm. Hg. Its refractive index (25–D) was found to be equal to 1.4921.

Example 6

Into a 1-litre Grignard apparatus, equipped with a stirrer device, a condenser connected to a pad, a glass electrode connected to a pH meter and 2 graduated ampoules, there are introduced 2 moles of ammonium thiocyanate NH$_4$CNS, i.e., 152.3 g., in solution in 140 ml. of water. The solution is cooled to +5° C. and kept at this temperature while introducing epichlorhydrin

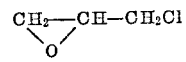

by means of one of the graduated ampoules at the rate of 1.1 mols. per hour, i.e., 101.7 g./h. Throughout this period of adding the epichlorhydrin, the pH of the reaction medium is kept at the value of 1, by introducing a 50% sulphuric acid solution from other graduated ampoule. After 2 hours, when a total 2.2 mols of epichlorhydrin (203.5 g.) had been introduced, the operation is stopped. The quantity of sulphuric acid solution poured into the apparatus is then 110 ml.

After decantation from the aqueous phase of the reaction medium, there are collected 260 ml. of organic phase formed by 1-hydroxy-2-thiocyanato-3-chloropropane

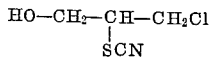

To this product, there are added 135 ml. of 40% aqueous sulphuric acid and the mixture is brought to boiling point, which is at 125° C. The solution becomes cloudy and a viscous organic compound can be decanted off. There are thus separated 290 g. of crude 5-chloro-methyl-2-one-1,3-oxathiolane (chloropropylene monothiocarbonate), the rectification of which yields 213 g. of pure product:

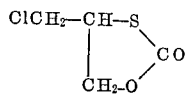

This compound has a boiling point of 90° C./0.15 mm. Hg., a refractive index of 1.5320 for the D line at 22° C.; its density $d_4^{22}=1.4483$. The yield of the preparation is found to be 70% with respect to the ammonium thiocyanate which is used.

We claim:

1. Method for the preparation of optionally halogenated alkylene monothiocarbonates, which comprises condensing a thiocyanate selected from the group consisting of alkali metals thiocyanates, alkaline-earth metals thiocyanates and ammonium thiocyanate with one of the alkylene oxides the molecule of which contains 2 to 5 carbon atoms and 0 to 2 halogen atoms, in a very acid aqueous medium having a pH of at least 3 at a temperature from 0° to 50° C. until the hydroxythiocyanate of the alkylene is produced, then isomerizing, cyclizing and hydrolyzing the hydroxythiocyanate formed by treating said hydroxythiocyanate in an acid medium, and separating the monothiocarbonate thus obtained from the aqueous medium.

2. Method for preparing monothiocarbonates of alkylenes having 2 to 5 carbon atoms and 0 to 2 chlorine atoms, which comprising contacting one of the alkylene oxides the molecule of which contains 2 to 5 carbon atoms and 0 to 2 chlorine atoms with an acid aqueous solution of a thiocyanate selected from the group consisting of alkali metals thiocyanates, alkaline-earth metals thiocyanates and ammonium thiocyanate, the pH of which is kept at a value of 0 to 3, at a temperature of 0° to 50° C. until a hydroxythiocyanate of the alkylene is produced; separating the alkylene hydroxythiocyanate from said aqueous solution; mixing the hydroxythiocyanate with a strong aqueous acid and heating the mixture at a temperature of 60° to 200° C. until the hydroxythiocyanate is transformed into alkylene monothiocarbonate; and recovering the monothiocarbonate from the aqueous mixture.

3. Method according to claim 2, wherein the alkylene hydroxythiocyanate is separated from said aqueous solution by extracting it by means of an organic solvent, separating the solvent from the aqueous solution and then driving off the solvent.

4. Method according to claim 2, wherein the alkylene hydroxythiocyanate is separated from said aqueous solution by extracting it by means of chloroform, separating the chloroform from the aqueous solution and then driving off the chloroform.

5. Method for preparing monothiocarbonates of alkylenes having 2 to 5 carbon atoms and 0 to 2 chlorine atoms, which comprising contacting one of the alkylene oxides the molecule of which contains 2 to 5 carbon atoms and 0 to 2 chlorine atoms with an acid aqueous solution of a thiocyanate selected from the group consisting of alkali metals thiocyanates alkaline-earth metals thiocyanates and ammonium thiocyanate, the pH of which is kept at the value of 0 to 3, at a temperature of 0° to 50° C. until a hydroxythiocyanate of the alkylene is produced; extracting the hydroxythiocyanate from the solution by means of chloroform and separating the chloroform from the solution; treating with dry hydrochloric acid, at about 10°, the chloroform which contains the hydroxythiocyanate, and separating the precipitate thus formed; mixing the precipitate with a strong aqueous acid and heating the mixture at a temperature of 60° to 200° C. until the hydroxythiocyanate is transformed into alkylene monothiocarbonate; and recovering the monothiocarbonate from the aqueous mixture.

6. Method for preparing monothiocarbonates of alkylenes having 2 to 5 carbon atoms and 0 to 2 chlorine atoms, which comprising contacting one of the alkylene oxides the molecule of which contains 2 to 5 carbon atoms and 0 to 2 chlorine atoms with an acid aqueous solution of ammonium thiocyanate, the pH of which is kept at a value of 0 to 3, at a temperature of 0° to 50° C. until a hydroxythiocyanate of the alkylene is produced; separating the alkylene hydroxythiocyanate from said aqueous solution by decanting it therefrom; mixing the hydroxythiocyanate with a strong aqueous acid and heating the mixture at a temperature of 60° to 200° C. until the hydroxythiocyanate is transformed into alkylene monothiocarbonate; and recovering the monothiocarbonate from the aqueous mixture.

7. Method for preparing alkylene monothiocarbonates which comprising contacting an alkylene oxide selected from the group consisting of ethylene oxide, 1,2-propylene oxide and epichlorhydrin, with an aqueous acid solution of ammonium thiocyanate the pH of which is kept at about 1, at a temperature of 2° to 12° C., until an alkylene hydroxythiocyanate is produced; separating the hydroxythiocyanate by decanting it from said aqueous solution; mixing the hydroxythiocyanate thus separated with an aqueous solution having about 50% sulfuric acid and heating the mixture at a temperature of 80° to 125° C. until the hydroxythiocyanate is transformed into alkylene monothiocarbonate; and recovering the monothiocarbonate produced from the aqueous sulfuric acid solution.

References Cited

Kaufman Arch. der Pharm., vol. 267 (1929), p. 211.
Price et al.: Jour. Amer. Chem. Soc., vol. 75 (1953), pp. 2396–2400.

JAMES A. PATTEN, *Primary Examiner.*

U.S. Cl. X.R.

260—454